Patented June 8, 1948

2,442,993

UNITED STATES PATENT OFFICE 2,442,993

DEHYDROFLUORINATION OF POLY-FLUOROALKANES

Oliver Wilfred Cass, Niagara Falls, N. Y., assignor to E. I. du Pont de Nemours & Company, Wilmington, Del., a corporation of Delaware No Drawing. Application September 5, 1946, Serial No. 695,049

6 Claims. (Cl. 260—653)

This invention relates to the catalytic dehydrofluorination of polyfluoroalkanes and, more particularly, to the dehydrofluorination of 1,1-difluoroethane to obtain vinyl fluoride.

The dehydrofluorination of polyfluoroalkanes to obtain fluoroalkenes has been accomplished by pyrolysis both in the absence and presence of various metals and salts as supported catalysts. In general, temperatures upwards of 600° C. are required and, as a consequence of these high temperatures, solid or tar-like carbonaceous deposits may collect on the catalyst, resulting in catalyst deactivation and/or plugging of the reactor. Further, at higher temperatures there is a tendency for the desired fluoroalkenes to react to give acetylenic compounds. Thus, for example, in the dehydrofluorination of 1,1-difluoroethane, not only vinyl fluoride but also appreciable amounts of acetylene may be formed.

An object of the present invention is to provide an improved process of dehydrofluorinating polyfluoroalkanes to obtain fluoroalkenes. A further object is to provide such a process in which undesired secondary reactions are avoided. A more particular object is to provide a process of dehydrofluorinating 1,1-difluoroethane to obtain vinyl fluoride at relatively low temperatures with the almost complete suppression of the reaction wherein acetylene is formed. Other objects will be apparent from the description of the invention given hereinafter.

The above objects are accomplished according to the present invention by heating in the vapor state a polyfluoroalkane containing 2 to 4 carbon atoms, inclusive, with at least two fluorine atoms attached to one carbon atom and at least one hydrogen atom on an adjacent carbon atom, in the presence of 0.1% to 10% by volume of oxygen at a temperature of 250° C. to 700° C. Preferably, the temperature is kept between 300° C. and 600° C., the proportion of oxygen is between 1% and 4% by volume of the mixture of oxygen and the polyfluoralkane, and the contact time at the temperature indicated is less than three minutes.

A convenient method for carrying out the present invention is to pass a mixture of the polyfluoroalkane and oxygen, such mixture containing about 2% oxygen by volume, through a tubular reactor heated at 400 C. to 500° C. under substantially atmospheric pressure. The fluoroalkene is recovered by rectification and thereby separated from hydrogen fluoride and unreacted polyfluoroalkane and possible traces of organic by-products such as acetylenes or allenes. Traces of acetylene which may be formed in the pyrolysis of 1,1-difluoroethane, can be removed by scrubbing with a suitable absorbent for acetylene, such as ammoniacal cuprous chloride. Alternatively, the pyrolysate may be passed through an absorbent for hydrogen fluoride, such as soda-lime, then through an absorbent for acetylenic by-products, and the fluoroalkene separated from unreacted polyfluoroalkane by rectification.

A suitable apparatus for carrying out the process comprises a means for continuously metering both oxygen and the polyfluoroalkane, a flowmeter or rotometer being adapted for this purpose, a tubular reactor of hydrogen fluoride-resistant material such as Inconel, nickel or platinum, towers for scrubbing the pyrolysate, and a still.

The polyfluoroalkanes may be prepared by a variety of reactions. For example, 1,1-difluoroethane of suitable quality for the process of this invention may be obtained by the addition of hydrogen fluoride to acetylene by the method disclosed in application Serial No. 633,556, filed December 7, 1945, in the names of Burk, Coffman and Kalb and entitled "Preparation of difluoroethane" now U. S. Patent No. 2,425,991. The method disclosed in said application comprises reacting acetylene with hydrogen fluoride in the liquid phase in the presence of catalytic amounts of boron trifluoride under substantially anhydrous conditions. The oxygen for use in the present invention may be commercial oxygen or air.

The following examples in which all parts are by weight unless otherwise specified, illustrate specific embodiments of the present invention.

Example I

A mixture of 1,1-difluoroethane and oxygen, said mixture containing 2% by volume of oxygen, was passed through a tubular Inconel reactor of $\frac{3}{16}$" inside diameter and a heated zone 7" long. The temperature of the reactor was maintained at 400° C. and the gas mixture was passed through at a velocity such that it was in the hot zone of the reactor for about 0.5 second. The crude pyrolysate was passed through soda-lime to absorb hydrogen fluoride and through aqueous silver nitrate to absorb acetylene. It was condensed in a trap chilled in a Dry Ice/acetone cooling mixture and distilled. From 140 parts of 1,1-difluoroethane was obtained 20 parts of vinyl fluoride corresponding to a conversion of 21%. In addition, 92 parts of 1,1-difluoroethane was recovered. Analysis of the silver nitrate solution indicated that .01 part of acetylene was formed.

There was no evidence of the formation of vinyl fluoride when 1,1-difluoroethane containing no oxygen was passed through a reactor heated to 400° C. at the velocity indicated.

Example II

A mixture of 1,1-difluoroethane and oxygen, said mixture containing 2% by volume of oxygen, was pyrolyzed in the apparatus of Example I at 500° C. and the products were isolated as in that example. At a reaction temperature of 500° C., 139 parts of 1,1-difluoroethane was converted to 59 parts of vinyl fluoride, representing a 61% conversion, and 0.27 part acetylene. There was recovered 40 parts of 1,1-difluoroethane. In the absence of added oxygen, vinyl fluoride was not obtained under the conditions of operation of this example.

Example III

A mixture of 1,1-difluoroethane and oxygen which contained 0.5% by volume of oxygen, was pyrolyzed under the conditions of Example I. Six parts of vinyl fluoride and 0.002 part of acetylene were formed from 155 parts of 1,1-difluoroethane, while 123 parts of 1,1-difluoroethane was recovered from the pyrolysate.

Example IV

A mixture of 2,2-difluorobutane and oxygen, said mixture containing 2% by volume of oxygen, was passed through the Inconel reactor of Example I at a temperature of 400° C. and a contact time of 0.42 second. The crude pyrolysate was passed through soda-lime to absorb hydrogen fluoride and was condensed in a trap chilled in Dry Ice/acetone cooling mixture. To facilitate separation and identification of the fluorobutene, the reaction mixture was brominated at a temperature of −30° C. and the resultant dibromfluorobutane was separated from unreacted difluorobutane by rectification. From 120 parts of 2,2-difluorobutane, 11 parts of the dibromide corresponding to 4% conversion was obtained in addition to 98 parts of unreacted 2,2-difluorobutane. When 2,2-difluorobutane in absence of added oxygen was passed through the reactor under the conditions of operation of this example, no evidence of dehydrofluorination was found.

It will be understood that the above examples are merely illustrative and that the invention broadly comprises dehydrofluorinating polyfluoroalkanes containing 2 to 4 carbon atoms, inclusive, with at least two fluorine atoms attached to one carbon atom and at least one hydrogen atom on an adjacent carbon atom, in the presence of 0.1% to 10% by volume of oxygen at a temperature of 250° C. to 700° C.

While the specific examples show the invention as applied to 1,1-difluoroethane and 2,2-difluorobutane, the invention is equally applicable to any polyfluoroalkane containing 2 to 4 carbon atoms, inclusive, providing it is characterized by having at least two fluorine atoms attached to one carbon atom and at least one hydrogen atom on an adjacent carbon atom. Other specific polyfluoroalkanes of this particular type include 1,1,1-trifluoroethane, 1,1-difluorobutane, and 2,2-difluoropropane.

A considerable variation in the proportion of oxygen used is permissible. Based on the volume of the mixture of the polyfluoroalkane and oxygen, concentrations of oxygen higher than 10% are uneconomical because the catalytic effect does not increase appreciably above this concentration and the polyfluoroalkane or its dehydrofluorination product may be oxidized extensively at pyrolysis temperatures. Oxygen concentrations between 1% and 4%, by volume, are especially beneficial. On the other hand, less than 0.1% concentration of oxygen would hardly be used as the advantages of oxygen as a catalyst are not sufficiently realized. Approximately 2% of oxygen, by volume of the mixture of oxygen and the polyfluoroalkane, is the preferred specific concentration. The proportion of oxygen is expressed throughout the specification and claims with respect to the total volume of the mixture of oxygen and the polyfluoroalkane.

The temperature to which the mixture of gases are subjected, should be between 250° C. and 700° C. and, preferably, should be in the more limited range of 300° C. to 600° C. At temperatures below 300° C. the conversion to fluoroalkenes becomes relatively low while above 600° C. side reactions, especially acetylene formation, tend to be excessive. Normally, a temperature of 400° C. to 500° C. will be used as this range represents the most advantageous balance of the factors involved.

Pressure is not a critical factor in the reaction provided the reactants are in the vapor state; this obviously excludes pressures so great that the reactants would be liquefied at the temperature employed. The pressure may well be varied anywhere from 0.1 to 100 atmospheres but atmospheric and subatmospheric pressures are preferred because the extent of conversion of polyfluoroalkane to fluoroalkene increases somewhat as the pressure under which pyrolysis is effected decreases.

Heating of the mixture of polyfluoroalkane and oxygen, that is, the contact time, will in all instances be relatively short and not exceed three minutes in duration. Although it will depend somewhat on the specific apparatus used, it has been found the process may be most successfully carried out with good yields of fluoroalkenes using a contact time from 0.25 to 2.0 seconds. A contact time as short as 0.02 second may be used.

The process of this invention can be carried out very satisfactorily by passing the mixture of oxygen and polyfluoroalkane through a reactor heated to the desired temperature. It is desirable that the gases be passed through the reactor at a sufficiently high linear velocity so that the nature of the flow is turbulent rather than viscous. Under turbulent flow conditions the polyfluoroalkane is heated more uniformly and higher conversions to the desired fluoroalkene with less formation of undesired side-products may be obtained. The linear velocity at which the flow becomes turbulent is a function of reactor diameter, temperature, and the nature of the specific polyfluoroalkane and cannot, therefore, be defined precisely. Nevertheless, velocities of the order of 0.5 to 100 meters per second are generally satisfactory. A turbulent flow is not essential, even though desirable, because good conversions to fluoroalkenes may be obtained within the viscous flow region, provided the contact time limits which have been set forth above, are not exceeded.

An outstanding advantage of the present invention is that it provides a practical means of dehydrofluorinating polyfluoroalkanes at relatively moderate temperatures with good yields of the desired fluoroalkenes and minimum formation of acetylenic compounds. The fluoroalkenes produced by the process of this invention are useful as intermediates in the synthesis of fluorohydrocarbons. Members of this class of organic materials may be polymerized or interpolymerized to form valuable plastics or resins. A particularly valuable fluoroalkene is vinyl fluoride from which polymers of excellent physical properties and unusual inertness may be prepared.

As many apparently widely different embodiments of this invention may be made without departing from the spirit and scope thereof, it is to be understood that the invention is not limited to the specific embodiments thereof except as defined in the appended claims.

I claim:

1. Process of dehydrofluorinating a polyfluoroalkane containing 2 to 4 carbon atoms, inclusive, with at least two fluorine atoms attached to one carbon atom and at least one hydrogen atom on an adjacent carbon atom, which comprises heating in the vapor state a mixture of said polyfluoroalkane and 0.1% to 10%, by volume of said mixture, of oxygen at a temperature of 250° C. to 700° C.

2. Process of dehydrofluorinating a polyfluoroalkane containing 2 to 4 carbon atoms, inclusive, with at least two fluorine atoms attached to one carbon atom and at least one hydrogen atom on an adjacent carbon atom, which comprises heating in the vapor state a mixture of said polyfluoroalkane and 1% to 4%, by volume of said mixture, of oxygen at a temperature of 300° C. to 600° C.

3. Process of dehydrofluorinating a polyfluoroalkane containing 2 to 4 carbon atoms, inclusive, with at least two fluorine atoms attached to one carbon atom and at least one hydrogen atom on an adjacent carbon atom, which comprises heating in the vapor state a mixture of said polyfluoroalkane and approximately 2%, by volume of said mixture, of oxygen at a temperature of 400° C. to 500° C.

4. Process of dehydrofluorinating 1,1-difluoroethane which comprises heating in the vapor state a mixture of said 1,1-difluoroethane and 0.1% to 10%, by volume of said mixture, of oxygen at a temperature of 250° C. to 700° C.

5. Process of dehydrofluorinating 1,1-difluoroethane which comprises heating in the vapor state a mixture of said 1,1-difluoroethane and 1% to 4%, by volume of said mixture, of oxygen at a temperature of 300° C. to 600° C.

6. Process of dehydrofluorinating 1,1-difluoroethane which comprises heating in the vapor state a mixture of said 1,1-difluoroethane and approximately 2%, by volume of said mixture, of oxygen at a temperature of 400° C. to 500° C.

OLIVER WILFRED CASS.

REFERENCES CITED

The following references are of record in the file of this patent:

UNITED STATES PATENTS

| Number | Name | Date |
|---|---|---|
| 2,379,372 | Mugdan et al. | June 26, 1945 |

OTHER REFERENCES

Biltz, "Ber. Deut. Chem.," vol. 35, pages 3524–3528 (1902).